United States Patent [19]

Nozik

[11] Patent Number: 4,634,641
[45] Date of Patent: Jan. 6, 1987

[54] SUPERLATTICE PHOTOELECTRODES FOR PHOTOELECTROCHEMICAL CELLS

[75] Inventor: Arthur J. Nozik, Boulder, Colo.

[73] Assignee: The United States of America as represented by the United States Department of Energy, Washington, D.C.

[21] Appl. No.: 751,413

[22] Filed: Jul. 3, 1985

[51] Int. Cl.⁴ ............................................. H01M 6/36
[52] U.S. Cl. ................................. 429/111; 204/290 R; 204/DIG. 3
[58] Field of Search ................. 429/111; 204/128, 129, 204/242, 248, 278, 290 R, DIG. 3

[56] References Cited

PUBLICATIONS

A. J. Nozik et al, Nature, vol. 316, Jul. 4, 1985, pp. 51–53.
M. Archer, Nature, vol. 316, Jul. 4, 1985, pp. 15–16.

Primary Examiner—Aaron Weisstuch
Attorney, Agent, or Firm—Kenneth L. Richardson; Michael J. Higgins; Judson R. Hightower

[57] ABSTRACT

A superlattice or multiple-quantum-well semiconductor is used as a photoelectrode in a photoelectrochemical process for converting solar energy into useful fuels or chemicals. The quantum minibands of the superlattice or multiple-quantum-well semiconductor effectively capture hot-charge carriers at or near their discrete quantum energies and deliver them to drive a chemical reaction in an electrolyte. The hot-charge carries can be injected into the electrolyte at or near the various discrete multiple energy levels quantum minibands, or they can be equilibrated among themselves to a hot-carrier pool and then injected into the electrolyte at one average energy that is higher than the lowest quantum band gap in the semiconductor.

20 Claims, 9 Drawing Figures

SUPERLATTICE PHOTOELECTRODES FOR PHOTOELECTROCHEMICAL CELLS

CONTRACTUAL ORIGIN OF THE INVENTION

The United States Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

This invention relates generally to photoelectrochemical energy conversion techniques and, more specifically, to the application of superlattice semiconductors as photoelectrodes in photoelectrochemical energy conversion processes.

2. Description of the Prior Art

Photovoltaic cells, commonly known as solar cells, are essentially semiconductors that have capability of converting electromagnetic energy, such as light or solar radiation, directly to electricity. Such semiconductors are usually characterized by solid crystalline structures that have energy band gaps between their valence electron bands and their conduction electron bands. Free electrons normally cannot exist or remain in these band gaps. However, such photovoltaic cells are also characterized by materials of a type that when light is absorbed by them, electrons that occupy low-energy states are excited to jump the band gap to unoccupied higher-energy states. For example, when electrons in the valence band of a semiconductor absorb sufficient energy from photons of the solar radiation, they can jump the band gap to the higher-energy conduction band.

Electrons so excited to higher-energy states leave behind them unoccupied low-energy positions or "holes." Such "holes" can shift from atom to atom in the crystal lattice; thus, the holes act as charge carriers, as do free electrons, and contribute to the crystal's conductivity. Therefore, most of the photons that are absorbed in the semiconductor give rise to such electron-hole pairs. It is these electron-hole pairs that generate the photocurrent and, in turn, the photovoltage exhibited by solar cells.

These electron-hole pairs produced by the light would eventually recombine, thereby converting to heat or a photon the energy initially used to jump the band gap, unless prohibited from doing so. Therefore, a local electric field is created in the semiconductor by "doping" or interfacing dissimilar materials to produce a space-charge layer. This space-charge layer serves to separate the holes and electrons for use as charge carriers. Once separated, these collected hole and electron charge carriers produce a space charge that results in a voltage across the junction, which is the photovoltage. If these separated hole and charge carriers are allowed to flow through an external load before recombining, they constitute a photocurrent.

The photocurrent generated in a solar cell can be utilized in a number of ways. It can be collected at solid contacts or electrodes on the semiconductor and directed by conductors through external electrical loads to perform useful work. Also, much work has been done in the field of utilizing the photocurrent internally in an electrolysis processes. That is, the separated electron-hole pairs are utilized immediately in a photoelectrochemical cell to drive chemical oxidation and reduction reactions on the surfaces of the semiconductor electrode and counter electrode in the cell. See, for example, Robert T. Ross and Arthur J. Nozik, "Efficiency of Hot-Carrier Solar Energy Converters", *Journal of Applied Physics*, vol. 53, pp. 3813-3818 (1982); A. J. Nozik, "Photoelectrochemical Devices for Solar Energy Conversion", Photovoltaic and Photoelectrochemical Solar Energy Conversion, pp. 263-312 (Plenum Publishing Corporation, 1981); Arthur J. Nozik, "Introductory Lecture: Photoelectrochemistry", *Faraday Discussions of the Royal Society of Chemistry*, No. 70, Photoelectrochemistry (1980); A. J. Nozik, et al. "Charge Transfer at Illuminated Semiconductor-Electrolyte Interfaces", Interfacial Photoprocesses: Energy Conversion and Synthesis, *Advances in Chemistry Series* vol. 184, American Chemical Society (1980), based on a symposium sponsored by the Division of Colloid and Surface Chemistry at the 176th meeting of the American Chemical Society, Miami Beach, Fla., Sept. 11-13, 1978; Arthur J. Nozik, "Photoelectrochemistry: Applications to Solar Energy Conversion," *Ann. Rev. Phys. Chem*, vol. 29, pp. 189-222 (1978); Gerald Cooper, et al. "Hot Carrier Injection of Photogenerated Electrons at Indium Phosphide-Electrolyte Interfaces", *Journal of Applied Physics*, vol. 54, pp. 6463-6473 (1983); John A. Turner and Arthur J. Nozik, "Evidence for Hot-Electron Injection Across p-GaP/Electrolyte Junctions", *Applied Physics Letters*, vol. 41, pp. 101-103 (1982); D. S. Boudreaux, et al. "Hot Carrier Injection at Semiconductor-Electrolyte Junctions", *Journal of Applied Physics*, vol. 51, pp. 2158-2163 (1980); F. Williams and A. J. Nozik, "Solid State Perspectives of the Photoelectrochemistry of Semiconductor-Electrolyte Junctions", *Nature*, vol. 311, pp. 21-27 (1984); J. A. Turner, et al. "Photoelectrochemistry with p-S Electrodes: Effects of Inversion", *Applied Physics Letters*, vol. 37, pp. 488-491 (1980); J. A. Turner, "SupraBand-Edge Reactions at Semiconductor-Electrolyte Interfaces: Band-Edge Unpinning Produced by the Effects of Inversion", *American Chemical Society Symposium Series* (1980).

Electrolysis is, of course, the decomposition of a chemical compound by an electrode current. For example, it is a common process to decompose an electrolyte comprising water, i.e., $H_2O$ into its constituent elements of hydrogen and oxygen in a redox reaction generally described as:

$$2H_2O \rightarrow 2H_2 + O_2$$

where $$4h^+ + 2H_2O \rightarrow O_2 + 4H^+$$

and $$2(2H^+) + 2(2e^-) \rightarrow 2H_2$$

In such an electrolysis process, the hydrogen gas ($H_2$) bubbles off the negative electrode or cathode, and the oxygen gas ($O_2$) bubbles off the positive electrode or anode. The hydrogen and oxygen gases can, of course, be put to many wellknown beneficial uses, including the production of fuel.

One of the historic impediments to the large-scale use of electrolysis processes for the production of fuel has been the inefficiencies of such processes. Specifically, the electric energy input required to drive the redox reaction is not justified by the energy output available from the fuel derived in the process. However, interest in this area has been increased by the possible use of solar radiation to drive the redox reaction through the use of solar cell semiconductors as electrodes in the electrolysis process.

Such processes, now commonly referred to as photoelectrochemical energy conversion, are the subject of the previously-cited references. They essentially comprise immersing a semiconductor material in a liquid electrolyte and exposing the semiconductor material to light. The semiconductor-liquid interface creates the local electric field to produce the depletion zone (or space charge) and under illumination generates a voltage and current across the semiconductor-liquid interface. Such an interface is essentially like a Schottky semiconductor heterojunction formed by an interface of different materials, although the term Schottky heterojunction is usually used to refer to a solid semiconductor-metal interface.

When exposed to light, the internal photocurrent induced in the semiconductor drives the electrolysis reaction. Essentially, the photoexcited charge carriers (electrons that have jumped the band gap to the higher energy level conduction band) are injected into the electrolyte from the semiconductor before the electron-hole pairs can recombine across the band gap. Such charge carriers injected into the electrolyte take part in the redox chemical reaction in the electrolysis process.

It is known, as also discussed in the previously-cited references, that photon energies in excess of the threshold energy gap or band gap between the valence and conduction bands are usually dissipated as heat, and thus are wasted and do no useful work. More specifically, there is a fixed quantum of potential energy difference across the band gap in the semiconductor. In order for an electron in the lower-energy valence band to be excited to jump the band gap to the higher-energy conduction band, it has to absorb a sufficient quantum of energy, usually from an absorbed photon, with a value at least equal to the potential energy difference across the band gap.

If the electron absorbs less than that required for the threshold quantum of energy, it will not be able to make the jump across the band gap. Such energy is essentially lost for practical purposes.

On the other hand, if the electron absorbs more than the threshold quantum of energy, e.g., from a larger energy photon, it can jump the band gap. The excess of such absorbed energy over the threshold quantum required for the electron to jump the band gap results in the electron being higher in energy than most of the other electrons in the conduction band. Such electrons having energy levels higher than the lower edge of the conduction band, i.e., the top edge of the band gap, are referred to as "hot electrons". For every electron excited out of its normal energy level, there is a corresponding "hole". Thus, for each hot electron, there can be a corresponding hot hole, both of which are generally referred to as "hot carriers".

Hot carriers usually lose their excess energy to the host lattice very rapidly in the form of heat. This process, in which the hot carriers dissipate their excess energy to the host lattice and equilibrate with the lattice at ambient temperature, is known as thermalization. Such thermalization of hot carriers results in the carriers being reduced in energy to the energy level at the edge of the conduction band. Since such thermalization normally occurs in about $10^{-12}$ seconds, the photocurrent delivered to a load or injected into an electrolyte comprises carriers having energy levels at the lower edge of the conduction band. In other words, the effective photovoltage of a single band gap semiconductor is limited by the band gap.

The practical effect of this limitation prior to this invention was that the semiconductor designer had to sacrifice efficiencies in one area in order to achieve them in another. Specifically, in order to capture as many photons from the spectrum of solar radiation as possible, the semiconductor had to be designed with a small band gap so that even small photons from lower energy radiation could excite electrons to jump the band gap. However, in doing so, there were at least two negative effects that had to be traded. First, the small band gap resulted in a low photovoltage device, thus low power output. Second, the more energetic photons from higher energy radiation produced many hot carriers having much excess energy that would be lost as heat upon almost immediate thermalization of these hot carriers to the edge of the conduction band. On the other hand, if the semiconductor is designed with a larger band gap to increase the photovoltage and reduce energy loss caused by thermalization of hot carriers, then the smaller photons from lower-energy radiation will not be absorbed.

Consequently, prior to this invention, it was necessary to balance these considerations and try to design a semiconductor with an optimum band gap, realizing that in the balance, there had to be a significant loss of energy from both large and small energy photons. It has been calculated that the theoretical maximum energy conversion with conventional single band gap semiconductors is about 31%. However, if all the photon energy from the visible light spectrum could be captured and used, the theoretical conversion efficiency of a semiconductor would be about 68%.

Many of the previously-cited references are directed at attempts to increase conversion efficiency by capturing and utilizing the excess energy of hot carriers by injecting them into an electrolyte for driving redox reactions before they thermalize. The theory of such attempts is that if the thermalization time of hot carriers was greater than their residence time in the semiconductor, then hot-carrier injection into the electrolyte could occur. However, because of the extremely rapid thermalization of the hot carriers, which occurs in about a picosecond in bulk semiconductors, no one has been able to achieve this goal prior to this invention.

It had been throught prior to this invention that it was necessary to either slow down the thermalization rate significantly or to find a way to remove the hot carriers in less than a picosecond. For example, in the previously-cited reference, Robert T. Ross and Arthur J. Nozik, "Efficiency of Hot-Carrier Solar Energy Converters", *Journal of Applied Physics*, vol. 53, pp. 3813–3818 (1982), it was suggested that with highly doped semiconductors used in combination with semiconductor-liquid or semiconductor-solid interfaces where large electric fields exist because of initial chemical potential differences between the phases, resulting quantization effects in the space charge layer would slow down the thermalization process and enhance hot carrier charge transfer out of the semiconductor. However, nothing close to the ultimate theoretical conversion efficiencies of 66% could be attaind by such systems because most of the thermalization of photogenerated hot carriers occurs in the much larger bulk region of the semiconductor (where the energy bands are flat) rather than in the small depletion zone or space-charged region where the band bending and quantization effects occur.

Consequently, there remains a need for a device that can capture and utilize a large range of photon energies from the solar radiation spectrum, yet not sacrifice either photovoltage or excess energy loss to heat by thermalization of hot carriers. This need has remained unsatisfied until this invention.

Another development that was occurring about the same period as the attempts just described to utilize photoelectrochemical processes for solar energy conversion, although in different research endeavors, was the development of superlattice semiconductor structures. Much of the development, experimentation, observations, and theories of such superlattice semiconductor structures are reported or described in the following prior art references: R. Dingle, et al. "Direct Observation of Superlattice Formation in a Semiconductor Heterostructure", *Physics Review Letters*, vol. 34, pp. 1327-1330 (1975); Raymond Dingle, "Confined Carrier Quantum States in Ultrathin Semiconductor Heterostructures", *Feskorterproblem*, vol. 15, pp. 21-48 (1975); P. L. Gourley and R. M. Biefield, "Growth and Photoluminescence Characterization of a $GaAs_xP_{1-x}$/GaP Strained-Layer Superlattice", *Journal of Vacuum Science Technology*, vol. 21, pp. 473-475 (1982); John A. Moriaty and Srinivasan Krishnamurthy, "Theory of Silicon Superlattices: Electronic Structure and Enhanced Mobility", *Journal of Applied Physics*, vol. 54, pp. 1892-1902 (1983); L. L. Chang, "A Review of Recent Advances in Semiconductor Superlattices", *Journal of Vacuum Science Technology B*, vol. 1, pp. 120-125 (1983); Gottfried H. Dohler, "Solid State Superlattices", *Scientific American*, vol. 249, pp. 144-151 (1984); P. L. Gourley and R. M. Biefield, "Quantum Size Effects in $GaAs/GaAs_xP_{1-x}$ Strained-Layer Superlattices," *Applied Physics Letters*, vol. 45, pp. 749-751 (1984); and Venkatesh Narayanamurti, "Crystalline Semiconductor Heterostructures", *Physics Today*, pp. 24-32 (October 1984).

Essentially, superlattice structures are specially structured semiconductors in which two materials with different electronic properties are interleaved in thin layers by depositing sheets of two semiconducting materials in alternation or by introducing impurities into alternating layers of a single semiconducting material. Superlattices comprising alternating ultrathin layers of two different semiconductors are known as compositional superlattices. Such compositional superlattices, in which the alternating materials have crystallized structures that do not closely match each other in interatomic lattice distances at their interface, are called strained-layer superlattices. On the other hand, a periodic array consisting of layers of the same semiconductor doped in two different ways is known as a doping superlattice.

Each alternating layer of semiconductor material or doping has a different band gap than its adjacent layers. This periodic alternation of layers, therefore, gives rise to a periodic alternation in electric potential. Each layer of the semiconductor with the smaller band gap produces what is called a potential well. Thus, the term "multiple-quantum-well" or "MQW" is often used to describe such semiconductors, particularly when the adjacent layers with the larger band gaps are thick enough to provide an effective barrier to the transfer of charge carriers in the conduction bands of the well layer.

It is known that the potential or quantum wells split the valence bands and the conduction bands into a plurality of minibands. These minibands are narrower than the bands in a bulk semiconductor and are separated from each other in the conduction band by relatively large minigaps. A result of this structure is that electron-hole pairs can be held separated for longer periods before they recombine. Also, photons are absorbed only if their energies equal or exceed a threshold value determined not by the band gap of either semiconductor alone, but by the effective band gap, which is the difference in energy between the least energetic conduction miniband and the most energetic valence miniband. Further, photon absorption is maximized where photon energies correspond to the differences in energy between pairs of minibands.

Another significant characteristic of superlattice semiconductors is that electronic properties of the superlattices can be designed. Specifically, values of energy levels available to electrons can be tailored by the appropriate choices of semiconductor materials or doping. Also, the widths of the minibands can be tailored.

While superlattice semiconductors exhibit many interesting characteristics and potential capabilities, their use in practical energy conversion applications has been somewhat limited by physical constraints in fabrication techniques, particularly relating to electrical connections or contacts. Specifically, prior to this invention, there was no known method or structure of drawing off the charge carriers from a superlattice semiconductor at the respective discrete and higher-energy levels of those charge carriers in the superlattice. Therefore, the use of superlattices has been primarily experimental for learning about their properties and potential capabilities. Some advances have been made in using superlattices in electronic control applications, such as transistors, oscillators, modulators, and the like. However, prior to this invention, there have been no practical uses made of superlattices as the photoactive element in solar energy conversion or particularly in the field of photoelectrochemistry. The present invention brings together for the first time knowledge from the two disciplines of photoelectrochemistry and solid-state superlattice semiconductors to provide breakthroughs both in efficient photoelectrochemical solar energy conversion and in a method of utilizing the beneficial capabilities of superlattice and multiple-quantum-well (MQW) semiconductors for solar energy conversion.

SUMMARY OF THE INVENTION

Accordingly, it is a general object of the present invention to provide a method and apparatus for achieving high solar energy conversion efficiency.

It is a more specific object of this invention to provide a highly efficient photoelectrochemical conversion system.

Another specific object of this invention is to provide a method and apparatus for capturing and utilizing a larger range of photon energies from the solar radiation spectrum while maintaining high photovoltage levels and minimizing energy loss to heat.

Another general object of this invention is to provide an efficient method of utilizing superlattice and multiple-quantum-well semiconductors in solar energy conversion.

A further specific object of this invention is to provide a method for capturing and siphoning off hot carriers from a semiconductor prior to thermalization.

A still further specific object of the present invention is to provide an efficient and effective photoelectrochemical electrode for electrolysis processes.

Another specific object of the present invention is to provide an efficient method and apparatus for injecting hot carriers into an electrolyte for driving electrolysis processes.

Still another specific object of the present invention is to provide an electrode for a photoelectrochemical cell that is capable of capturing photons at discrete energy levels, creating charge carriers corresponding to such discrete energy levels, and transferring such carriers essentially at those energy levels into an electrolyte solution to drive beneficial chemical reactions to produce useable fuels or chemicals.

Yet another object of the present invention is to provide a method and apparatus for monitoring the basic properties of superlattice semiconductor devices.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities and in combinations particularly pointed out in the appended claims.

To achieve the foregoing and other objects and in accordance with the purposes of the present invention, as embodied and broadly described herein, the method and apparatus of this invention may comprise the use of a superlattice or multiple quantum well semiconductor as a photoelectrode in photoelectrochemical processes, such as for driving redox reactions in an electrolyte. The method may include immersing a superlattice or multiple quantum well semiconductor in a liquid electrolyte, coupling the superlattice or multiple-quantum-well semiconductor to an electrode or to another such semiconductor also immersed in the electrolyte a spaced distance away, and exposing the semiconductor(s) to solar radiation to produce a photocurrent for driving a chemical reaction, such as a redox chemical reaction. The apparatus includes the superlattice or multiple-quantum-well semiconductor(s) immersed in an electrolyte. It also may include the electrode plate and conductors for directing the photocurrent to the electrolyte and the redox couples therein.

BRIEF DESCRIPTION OF THE DRAWINGS

The accompanying drawings, which are incorporated in, and form a part of, the specification, illustrate the preferred embodiments of the present invention, and together with the description, serve to explain the principles of the invention.

In the drawings.

DETAILED DESCRIPTION OF THE PREFERRED EMBODIMENT

Figure 1:
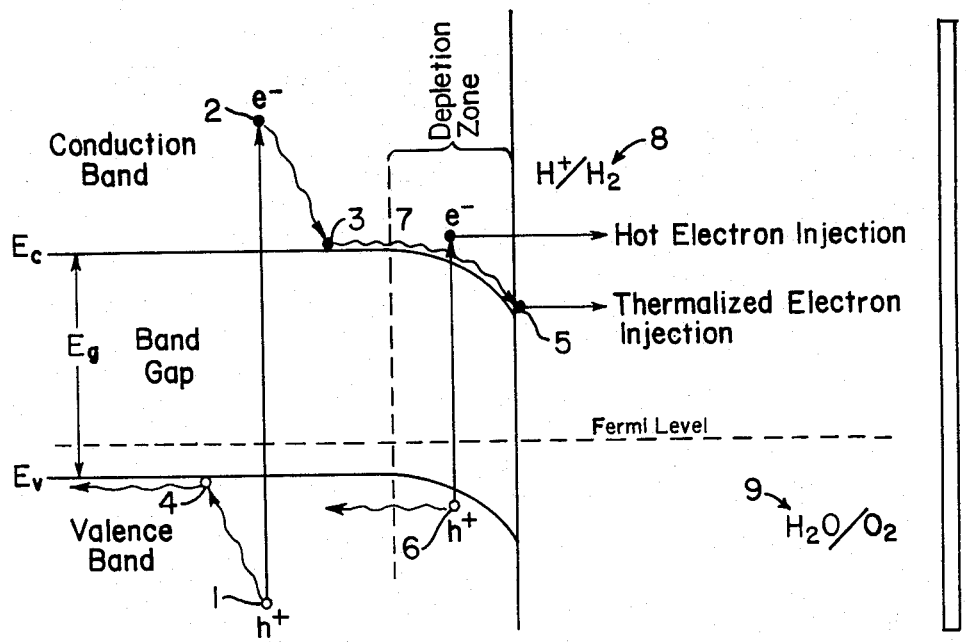
FIG. 1 is an energy level diagram for a prior art photoelectrochemical cell.

For the purposes of describing the present invention, it is necessary to refer first to the prior art semiconductor electrodes utilized in photoelectrochemical cells. A typical energy level diagram for such prior art photoelectrochemical cells is shown in FIG. 1. This energy diagram is based on a typical p-type semiconductor photoelectrode immersed in an electrolyte, such as water, a spaced distance from a metal plate also immersed in the electrolyte. The p-type semiconductor and the plate are connected electrically so that the p-type semiconductor functions as the cathode and the plate functions as the anode in the photoelectrochemical conversion process.

As illustrated in FIG. 1, the energy band gap $E_G$ is the distance between the upper edge of the valence band energy $E_V$ with the lower edge of the conduction band $E_C$. When a high-energy photon excites an electron 2 from the valence band to the conduction band, a positively charged "hole" 1 is left behind in the valence band. Thus, the absorbed photon creates an electron-hole pair. The electron-hole pair 1, 2 illustrated in FIG. 1 is a result of the electron having absorbed not only enough energy from the photon to jump the band gap $E_g$, but also enough energy to be excited to an energy level in the conduction band much higher than the level $E_C$ at the bottom of the conduction band. Such an electron excited to this high-energy level is called a "hot electron", and the corresponding hole 1 is called a "hot hole". Since both the hole 1 and the electron 2 are charged carriers, such highly excited electron-hole pairs are referred to as "hot carriers".

These hot carriers are not in thermal equilibrium with the host lattice; thus they will remain at their high energy level for a very short period, approximately a picosecond. Almost immediately, these hot carriers will give up their excess energy to the photons or vibrations of the crystal lattice in the form of heat. The result is that the hot carriers 1, 2 relax almost immediately to the energy level $E_C$ just above the band gap, while giving up their excess energy as heat to the crystal lattice. This relaxation process is called thermalization of the hot carriers.

The local electrical field is caused by a depletion zone adjacent the Schottky heterojunction at the interface of the semiconductor and electrolyte. This local electric field separates the electron-hole pairs and drives the electrons to the semiconductor/electrolyte interface and the holes to the plate through an electrical connection (not shown). In the electrolyte, redox couples such as the hydrogen ion to hydrogen gas redox couple 8 and water to oxygen gas redox couple 9 are present and will absorb the charge carriers at the semiconductor/electrolyte interface and the plate/electrolyte interface to drive the electrolysis reaction.

The result of the thermalization of the excited electron 2 to the bottom of the conduction $E_C$ is that the energy derived from the semiconductor and available for doing work in the electrolysis reaction is equal to the band gap energy $E_G$. The excess $E_G$ absorbed from the photon beyond the band gap energy $E_G$ is lost as heat to the semiconductor lattice and is not available for use in the electrolysis process.

As discussed in the background section, there is some evidence that with highly doped semiconductors used in combination with semiconductor/liquid or semiconductor/solid interfaces, where large electric fields exist because of initial chemical potential differences between the phases, that hot electrons in the depletion zone above the band gap $E_G$, as indicated at 6, 7, can be injected as hot carriers at their higher-energy levels directly into the electrolyte. However, since most of the thermalization of generated hot carriers occurs in the much larger bulk region of the semiconductor, where the energy bands are flat, than in the small depletion zones, where the band bending occurs, such hot electron ejection (known as type-I hot electrons) has not been a significant factor in increasing photon conversion efficiencies.

Figure 2:
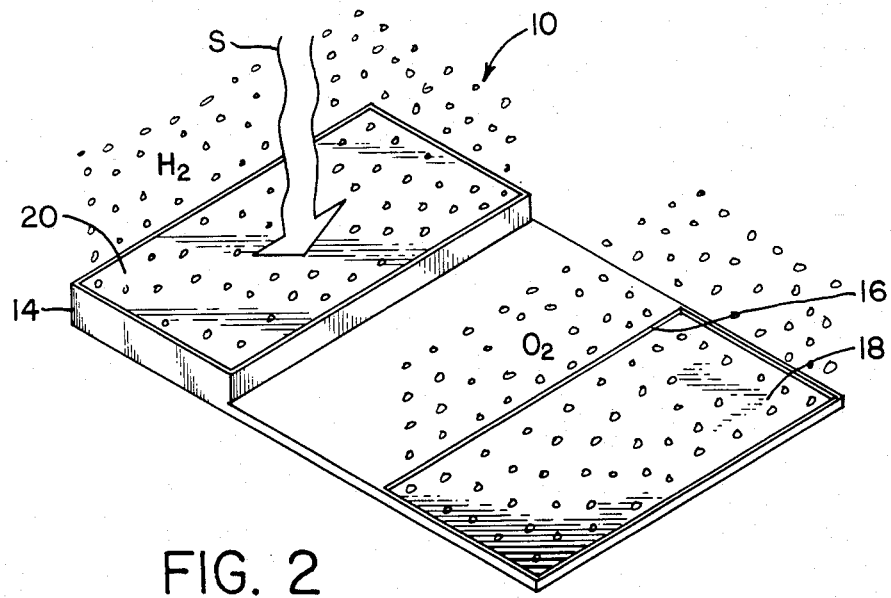
FIG. 2 is an isometric view of a multiple-quantum-well or superlattice photoelectrochemical cell according to the present invention.

The present invention, however, which includes multiple-quantum-well or superlattice photoelectrochemical cell 10, is shown in FIG. 2. It comprises a multiple-quantum-well or superlattice semiconductor 20 positioned on a plate 18 and encapsulated in an insulation material 14, except for the top surface thereof, which is left exposed. An opening 16 in insulation 14 exposes a portion of the plate 18. When the photoelectrochemical cell 10 is immersed in a liquid electrolyte and exposed to solar radiation S, the redox reaction occurs. The gases produced, such as hydrogen and oxygen from a water electrolyte, bubble off the cathode and anode portions of the cell 10, as will be described in more detail below.

Figure 3:
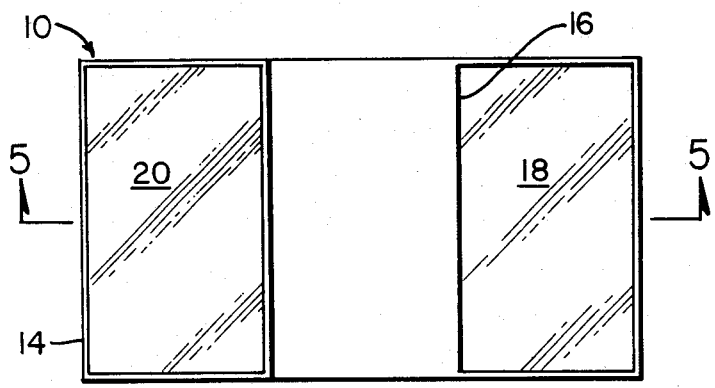
FIG. 3 is a plan view of the multiple-quantum-well or superlattice photoelectrochemical cell of the present invention.
Figure 4:
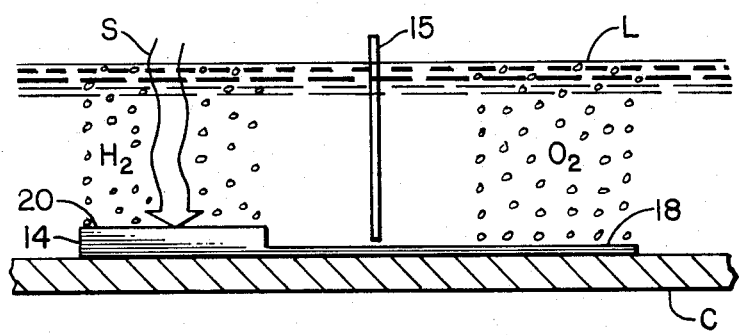
FIG. 4 is a side elevation view of the multiple-quantum-well or superlattice photoelectrochemical cell of the present invention shown immersed in a liquid electrolyte and exposed to sunlight to produce the desired redox chemical reactions.
Figure 5:
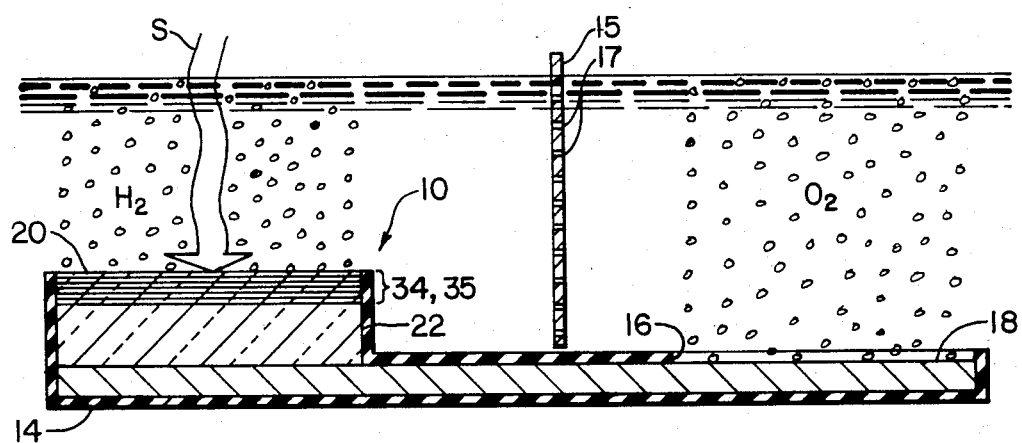
FIG. 5 is an enlarged cross-sectional view of the multipled quantum well or superlattice photoelectrochemical cell of the present invention shown immersed in an electrolyte liquid and exposed to sunlight.

The photoelectrochemical cell 10 of the present invention is shown in plan view in FIG. 3, and it is shown in FIG. 4 immersed in a liquid electrolyte L, such as water, in a container C. The hydrogen gas $H_2$ and oxygen gas $O_2$ bubbled off the cathode and anode portions of the cell 10 can be collected for use in ways well-known to persons skilled in the art. As shown in FIGS. 4 and 5, a semi-permeable membrane 15, having openings 17 therethrough, is used to segregate the hydrogen and oxygen gases. The openings 17 are small enough to exclude the gas bubbles from passing therethrough, but the liquid and ionic charge carriers can easily pass through the semipermeable membrane 15.

The structure of the photoelectrochemical cell 10 according to the present invention is best seen in FIG. 5, which is an enlarged cross-section taken along lines 5—5 of FIG. 3. As shown in FIG. 5, a multiple-quantum-well or superlattice semiconductor 20 is positioned on an ohmic or metal plate 18. The semiconductor 20 preferably comprises a crystalline substrate 22 having deposited thereon alternating layers of different crystalline semiconductor compositions having respectively different band gap characteristics. Such alternating layers are shown here as layers 34, 35, although in actual practice a larger number of alternating layers is preferable. For example, in actual practice approximately 20 layers is more practical. In this regard, it should be mentioned that because these alternating layers are extremely thin, usually in the range of 50 to 250 angstroms, it is necessary for purposes of illustration and clarity to exaggerate the dimensions, particularly in the vertical direction. Therefore, it should be realized that the illustrations for this invention, such as that shown in FIG. 5, are not intended to, and in fact cannot practically be, exact proportional illustrations of the semiconductor layers. It is expected that persons having ordinary skill in the art will understand the illustrations in this manner as represented in the accompanying drawings.

As shown in FIG. 5, when the superlattice semiconductor 20 is exposed to solar radiation S, a photoelectric potential or voltage is generated in the semiconductor 20. The ohmic plate 18 is connected electrically to the semiconductor 20 and has a portion exposed to the electrolyte L through the opening 16 in the insulation 14. A photoelectric current is therefore generated in the semiconductor 20 that flows through redox couples in the electrolyte L and the ohmic plate 18. In the illustration of FIG. 5, the top surface of the semiconductor 20 functions as the cathode, and the exposed surface of the ohmic plate 18 functions as the anode in the photoelectrochemical process resulting in the production of hydrogen gas $H_2$ and oxygen gas $O_2$, which bubble off the surfaces of the semiconductor 20 and ohmic plate 18, respectively.

Figure 6:
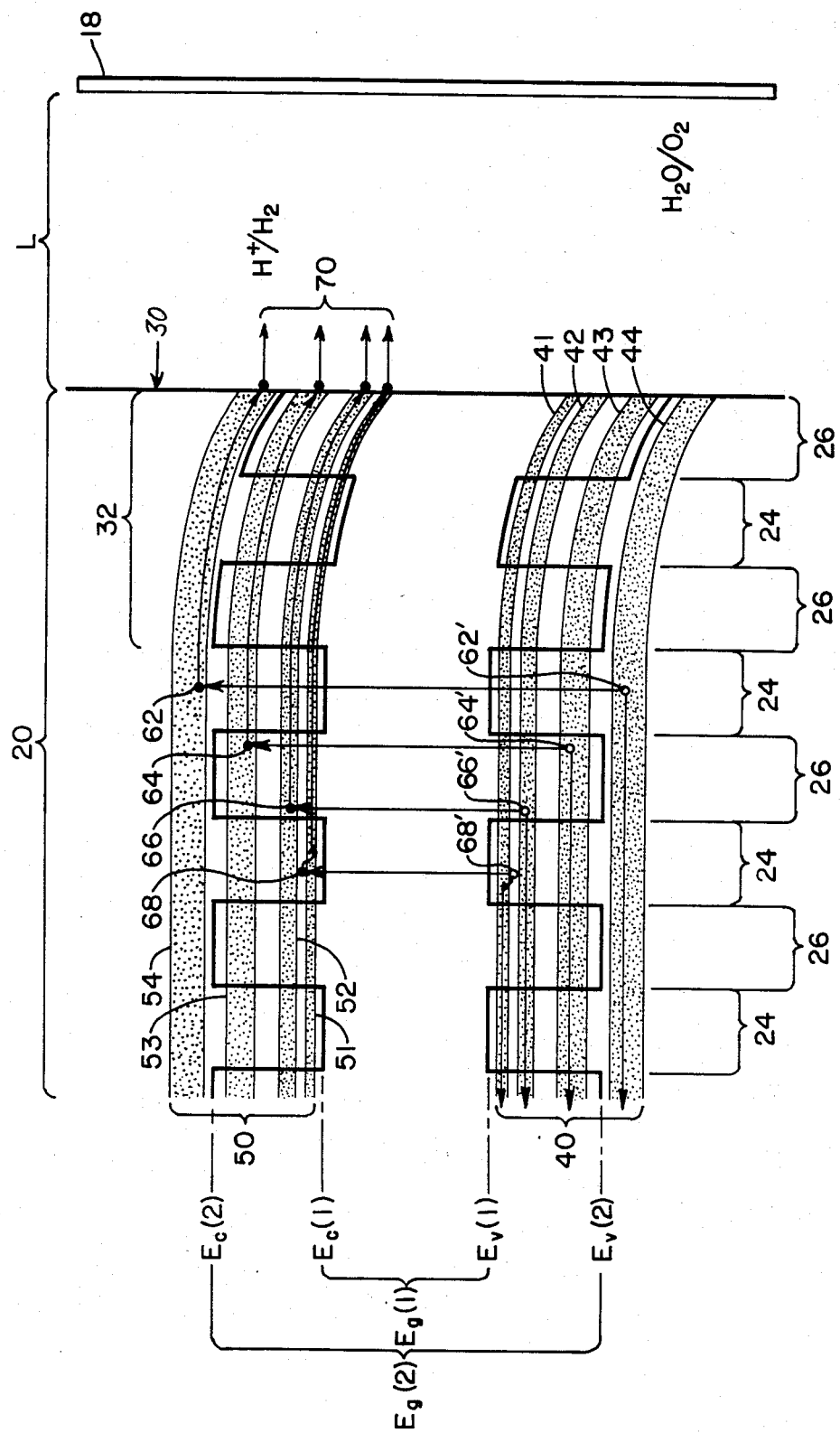
FIG. 6 is an energy level diagram of the superlattice photoelectrode of the present invention.

The energy diagram of FIG. 6 is used to describe in more detail the functions and characteristics of the present invention. As described briefly earlier, the superlattice semiconductor structure 20 comprises a substrate 22, preferably of some crystalline material, although recent advances in related fields are leading toward the eventual feasibility of polycrystalline, amorphous, and other semiconductor materials for photocells as well. For purposes of describing this invention, but not for limitation, the substrate 22 is described as gallium arsenide (GaAs) crystal. The alternating layers 34, 35 (shown in FIG. 5) are described as gallium arsenide (GaAs) and gallium arsenide phosphide ($GaAs_xP_{1-x}$), respectively. The GaAs has a band gap $E_g(1)$ of about 1.3 eV and $GaAs_{0.5}P_{0.5}$ has a band gap $E_g(2)$ of about 2.5 eV. The resulting superlattice semiconductor 20 is a strained layer compositional superlattice. It is understood, of course, that other semiconductor materials can also be used and are preferably selected from Group III, Group IV and Group V semiconductor materials.

The energy level diagram of FIG. 6 illustrates the composite effect of the alternating GaAs and $GaAs_{0.5}P_{0.5}$ layers 34, 35 with their different characteristic band gaps $E_g(1)$, $E_g(2)$, respectively. Essentially, the smaller band gaps $E_g(1)$ of the GaAs layers 34 sandwiched between the larger band gaps $E_g(2)$ of the $GaAs_{0.5}P_{0.5}$ layers 35 form what are called energy "wells" 26 between energy "barriers" 24. Further, minibands of specific quantum energy levels are formed within the wells 26. Such minibands 41, 42, 43, 44 below the valence energy level $E_v(1)$ for the GaAs layers 34 are referred to collectively as the valence minibands 40. Similarly, minibands 51, 52, 53, 54 above the conduction energy level $E_c(1)$ for the GaAs layers 34 are referred to collectively as the conduction minibands 50.

It was generally considered in the prior art that the wells 26 in such semiconductor structures were electronically isolated from each other when the barriers 24 were over 50 angstroms thick. Such semiconductor structures with barriers 26 over 50 angstroms thick have been generally referred to as "multiple-quantum-wells." However, when the barriers 24 are less than 50 angstroms thick, electrons and holes can tunnel through the barriers 24 from one well 26 to another. Thus, the minibands 40, 50 can extend through the barriers 24, to form conditnuous minibands through the bulk of the semiconductor, as shown in FIG. 6. Such semiconductor structures having barriers 24 less then 50 angstrons thick and having continuous minibands 40, 50 extending from well to well 26 through the barriers 24 have been referred to in the prior art as "superlattice" semiconductors.

As discussed briefly in the background section, superlattice semiconductors have some very unique and potentially beneficial characteristics that have not been useable to any significant extent, particularly in solar energy conversion applications, prior to this invention. Specifically, the minibands 40, 50 provide an ideal environment for capturing and holding hot carriers for long periods, thus having the potential of substantially slowing or reducing thermalization of such carriers and the resulting loss of useable electrical energy as heat or photons in the crystal lattice. Also, photon absorption is increased substantially where photon energies correspond to the band gaps between pairs of valence and conduction minibands. Such electronic properties can be designed and tailored in superlattice structures by varying the materials and thicknesses of the layers 34, 35.

Utilization of these characteristics is achieved in this invention by using the superlattice semiconductors as photoelectrodes in photoelectrochemical electrolysis processes. The specifics of such applications are described more fully below. However, it is appropriate to mention at this point that such photoelectrochemical processes according to this invention use the internal photoinduced electric current in driving chemical reactions rather than siphoning the charge carriers off the semiconductor in a conventional manner through electrodes or electrical conductors attached to the semiconductors to some external electrical load. In fact, one of the impediments of fully utilizing the advantageous characteristics of superlattice semionductors prior to this invention was that no solid energy sensitive electrode or conductor was capable of drawing the charge carriers off a superlattice semiconductor at the various individual discrete miniband energy levels for use in external electric loads at those various discrete energy levels.

In the present invention, however, chemical reactions can and do occur at different energy levels. Therefore, according to this invention, the electron and hole charge carriers can be drawn off at different energy levels in chemical reactions. Thus, photon energy that produces hot carriers can be utilized at the respective discrete energy levels of the hot carriers by selectively drawing the hot carriers off the superlattices at their respective discrete miniband levels to produce hydrogen and oxygen gases. The results is very minimal energy loss caused by thermalizing of hot carriers in the superlattice semiconductor. Further, the energy levels of the acceptor electrolytes or redox couples can be adjusted by turning the chemical reactions to the miniband energy levels of the superlattice and vice versa, thus even further increasing the efficiencies of solar energy conversion according to this invention. Another mode of hot carrier utilization in superlattice and multiple-quantum-well electrodes is where the hot charge carriers in the various minibands equilibrate among themselves to form a hot-carrier pool from which charge is then injected into the electrolyte at one higher average energy.

It is also appropriate to mention at this point that very high charge carrier transfer efficiencies from the semiconductor to the electrolyte chemical reactions have been observed with this invention, even in multiple quantum well semiconductor structures having barrier 24 thicknesses up to 250 angstroms. Such high carrier transfer efficiencies were unexpected in structures having barriers 24 thicker than the 50 angstroms maximum barrier thickness associated in the prior art with superlattice structures and is not yet fully explained. However, these results do call into question the prior art 50-angstrom barrier thickness distinction between superlattices and multiple-quantum-wells enough so that, at least for the purposes of describing and claiming this invention, strict adherence to that distinction is not necessary or helpful and will not be observed. In other words, since the multiple-layered compositions or doping semiconductors used with this invention seem to work as well with barriers 24 significantly over, as well as under, 50 angstroms thick, the terms "superlattice" and "multiple-quantum-well" are used interchangeably in the remaining description and claims herein.

Referring now to FIGS. 5 and 6, the alternating layers 34, 35 of GaAs and GaAs$_{0.5}$P$_{0.5}$, respectively, on the GaAs substrate 22 create the superlattice or multiple-quantum-well semiconductor 20 with valence minibands 40 and conduction minibands 50. The valence minibands 40 are illustrated in FIG. 6 as comprises four minibands 41, 42, 43, 44 and different energy levels under the valence band edge $E_v(1)$ of the GaAs layers 34. Likewise, the conduction minibands 50 are illustrated in FIG. 6 as comprises four minibands 51, 52, 53, 54, each of which corresponds to a respective one of the valence minibands 41, 42, 43, 44.

As mentioned previously, the sizes and energy levels of the minibands are functions of the compositions and thicknesses of the layers 34, 35. This type of superlattice is known as a compositional superlattice. Other kinds of superlattice structures known in the art can also be used; for example, a doping superlattice (not shown), consisting of an array of layers of the same semiconductor materials doped in different ways, can also be used in this invention. Further, compositional superlattices, such as that illustrated in FIG. 6, can also be doped to increase the mobility of electrons, as will be apparent to persons skilled in the art in view of this invention. Therefore, while the description of this invention is primarily based on a compositional superlattice photoelectrode, it should be understood that references to superlattices herein can apply to other types of superlattice semiconductors as well.

As shown in FIGS. 5 and 6, the superlattice semiconductor 20 is immersed in the liquid electrolyte L, thereby creating a heterojunction at the interface 30 between the exposed surface of the semiconductor 20 and the liquid electrolyte L. Such a semiconductor/liquid heterojunction is in the nature of a Schottky heterojunction and creates a depletion zone 32 adjacent the interface 30, which results in a local electric field that bends the energy levels and corresponding minibands 40, 50 in the depletion zone. This local electric field in the depletion zone is effective to separate the electron-hole pairs produced by photon absorption and drives an electric current to the electrolysis couples, such as the redox couples described above.

When the surface of the superlattice semiconductor 20 is exposed to solar radiation, as illustrated in FIGS. 2, 4, and 5, photons of solar energy are absorbed by valence band electrons. If the energy absorbed by one electron is sufficient, it will be excited enough to jump the band gap from the valence band to the conduction band. In a superlattice, the absorbed energy must be enough to excite the electron to jump from a valence miniband to a conduction miniband. Thus, as illustrated in FIG. 6, the energy absorbed by a valence electron, such as electron 68, must be at least enough for the electron 68 to jump the gap between the closest valence and conduction minibands 41, 51, respectively. If there is insufficient energy absorbed by the electron to jump that smallest miniband gap, the photon is not absorbed and therefore does not contribute to the energy conversion process. On the other hand, if the electron 68 makes the jump from the valence miniband 41 to conduction miniband 51, it will be captured by the conduction miniband 51 and pulled by the local electric field in the depletion zone toward the interface 30, as illustrated at 70 in FIG. 6. Simultaneously, the corresponding hole 68' is driven in the opposite direction away from the interface 30.

As shown in FIG. 5, the ohmic plate 18 is contacted to the substrate 22 and exposed to the electrolyte L a spaced distance from the superlattice semiconductor 20. The hole 68' is therefore effectively transferred to the plate 18 where it is available for the redox couple $H_2O/O_2$. The electrical connection between the superlattice 20 and the plate 18 could also be made via wire or other contacts or carrier transfer structures known to persons skilled in the art. Since the illustration in FIG. 6 is intended primarily as an energy diagram, no contact or carrier transfer structure for conducting the charge carriers between the superlattice 20 and the plate 18 is shown, but such structure is assumed to be present, as shown in FIG. 5, to complete the electric circuit.

If the electron 68 absorbs more energy from a photon than is necessary to jump the band gap between the closest valence and conduction minibands 41, 51, respectively, but not enough to jump the band gap between the next closest valence and conduction minibands 42, 52, respectively, as illustrated in FIG. 6, it will merely relax or thermalize down to the conduction miniband 51. Thus, a small amount of energy is lost to the lattice by thermalization. However, capture of the electron by the next lower miniband 51 minimizes such thermalization energy loss.

The electrons 66, 64, 62 shown in FIG. 6 are illustrated to have absorbed respectively higher-energy photons, exciting them to jump larger miniband gaps to be captured in respectively higher-energy conduction minibands 52, 53, 54. These "hot electrons" 66, 64, 62 are likewise driven by the electric field in the depletion zone in their respective discrete miniband energy levels to the interface 30, as illustrated at 70, 70, 70, respectively. Therefore, most of the energy absorbed by these "hot electrons" from higher-energy photons is conserved and delivered at the energy levels of the respective conduction minibands 52, 53, 54 to the electrolyte L at the interface 30. Simultaneously, of course, the corresponding holes 66', 64', 62' are driven in the opposite direction to the plate 18.

Any electrons (not shown) that are photoexcited above or between minibands will relax or thermalize only to the next lower miniband where they will be captured and delivered to the interface 30 at the energy level of that miniband. Thus, again, energy loss by hot electrons can be minimized significantly by superlattice structures designed or tailored to provide miniband energy levels that conform as nearly as possible to the photon energy levels that constitute the solar radiation S being absorbed by the semiconductor 20.

At the interface 30, the electrons 70, 70, 70, 70 are injected into the electrolyte L to drive the redox electrolysis chemical reaction. As mentioned briefly earlier, the $H^+/H_2$ redox couple receives electrons and the $H_2O/O_2$ redox couple receives holes to produce hydrogen and oxygen gases. As also mentioned briefly earlier, redox couples can receive and utilize electrons and holes at multiple energy levels to drive the chemical reactions. Thus, the solar energy absorbed by the superlattice semiconductor 20 can be converted to useable chemicals or gases at much higher-efficiency levels according to this invention than was possible in the prior art. Further, the use of superlattice photoelectrodes in combination with electrochemical reactions according to this invention provides a mechanism for extracting and utilizing hot-charge carriers from superlattices at or near their respective discrete miniband energy levels for solar energy conversion, which was not possible prior to this invention.

It should be mentioned that this invention contemplates the use of superlattice photoelectrodes in electrochemical voltaic cells wherein there is only one effective redox couple and the net free energy change in the electrolyte is zero, as well as in photoelectrosynthesis cells wherein two effective redox couples are present in the electrolyte and a net chemical change occurs. It also contemplates the use of superlattice photoelectrodes in all three types of photoelectrosynthesis cells known in the prior art as photoelectrochemical cells, photoelectrolysis cells, and photocatalysis cells.

One specific example of a compositional superlattice semiconductor structure that is satisfactory for use as a photoelectrode according to this invention is a strained-layer superlattice prepared on a $p^+$-GaAs crystalline substrate with a 10-micron $GaAs_{1-x}P_x$ buffer layer graded from X=0.05 to 0.25. There can be about 20 alternating layers of GaAs and $GaAs_{0.05}P_{0.5}$ prepared by metallorganic chemical vapor deposition using conventional deposition techniques. Each layer can be in the range of approximately 50 to 250 angstroms thick. The electrolyte can be prepared as a solution containing 0.2M ferricyanide in 1M $H_2SO_4$ or 0.1M $Eu^{3-}$ in 1M $HClO_4$.

Figure 7:
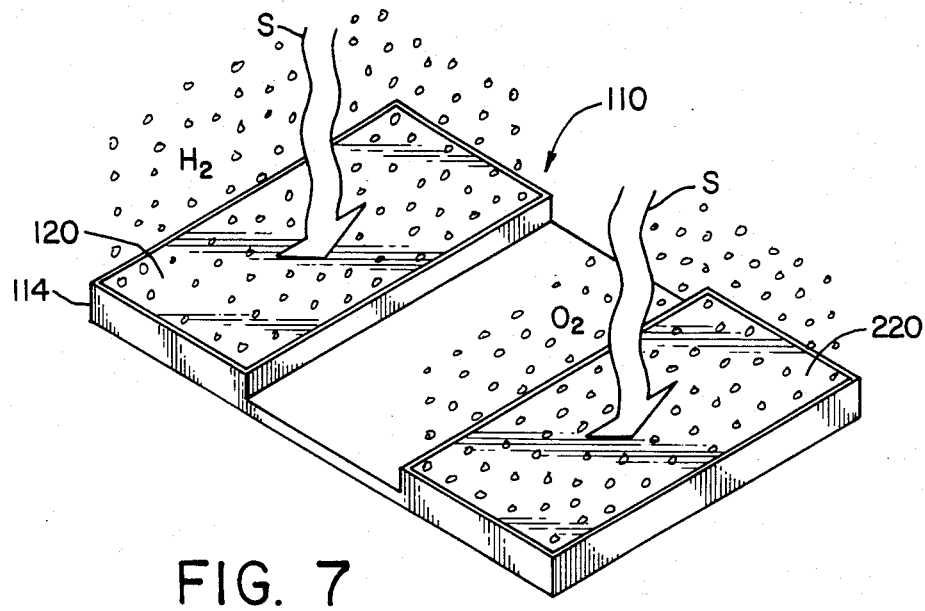
FIG. 7 is an isometric view of an alternate embodiment superlattice photoelectrochemical cell according to the present invention.
Figure 8:
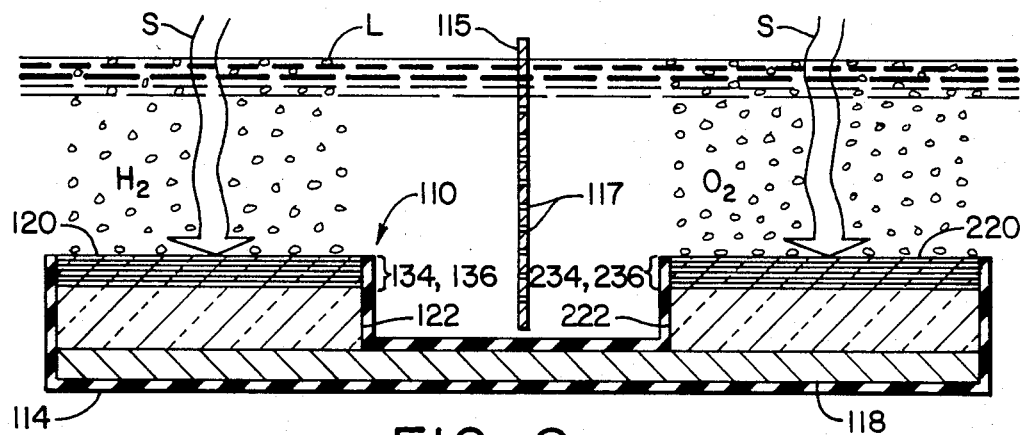
FIG. 8 is an enlarged cross-section of the alternate embodiment superlattice photoelectrochemical cell of FIG. 7 shown immersed in an electrolyte and exposed to solar radiation.
Figure 9:
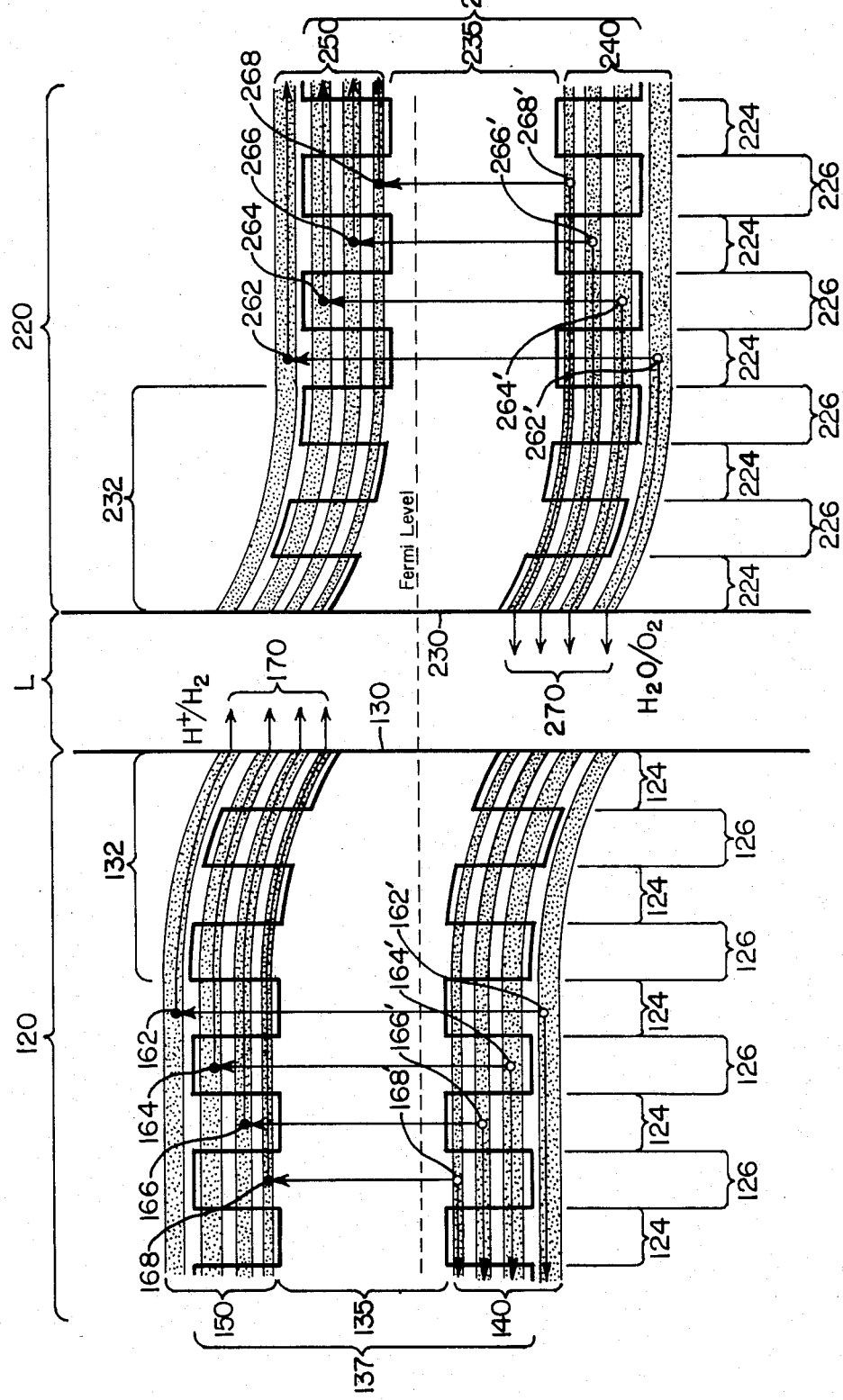
FIG. 9 is an energy level diagram of the alternate embodiment superlattice photoelectrochemical cell shown in FIGS. 7 and 8.

Another embodiment of a photoelectrochemical cell 110 according to the present invention is shown in FIGS. 7-9. In this embodiment 110, there are two superlattice semiconductors 120, 220, both of which have substrates 122, 222, respectively, contacted to a common plate 118. In this embodiment, the surface of the second semiconductor 220, rather than the surface of the plate 118, is exposed to the electrolyte L. The superlattice semiconductor 120 illustrated in FIGS. 7-9 is constructed essentially like that described for the preferred embodiment superlattice 10 described above. The superlattice semiconductor 120 comprises alternating compositional or doping layers 134, 136 deposited on the substrate 122. Likewise, the superlattice semiconductor 220 comprises a plurality of alternating layers of compositional or doping layers 234, 236 deposited on a substrate 222. The compositional layers 134, 136 have respective characteristic band gaps 135, 137, as illustrated in FIG. 9. These respective band gaps 135, 137 of the alternating layers 134, 136 form the energy level quantum wells 126 and barriers 124, resulting in the valance minibands 140 and conduction minibands 150, as shown in FIG. 9.

Likewise, the superlattice semiconductor 220 comprises alternating compositional layers 234, 236 having respective band gaps 235, 237. These alternating layers and respective band gaps form the energy level quantum wells 226 and barriers 224, resulting in the valence minibands 240 and conduction minibands 250.

In this photoelectrochemical cell embodiment 110, the respective superlattice semiconductors 120, 220 are preferably doped differently so that one of the semiconductors is a net p-type doped superlattice and the other is a net n-type superlattice. In the illustration of FIG. 9, the superlattice semiconductor 120 is illustrated to be a net p-type doped superlattice semiconductor, and the superlattice semiconductor 220 is illustrated to be a net n-type doped superlattice semiconductors. Both superlattice semiconductors 120 and 220 are immersed in the liquid electrolyte L a spaced distance from each other. Therefore, the superlattice semiconductor 120 forms an interface 130 with the electrolyte L, and the superlattice semiconductor 220 forms an interface 230 with the electrolyte L at their respective exposed compositional layer surfaces.

As further shown in FIG. 9, the semiconductor-liquid heterojunction interface 130 with the p-type doped semiconductor 120 results in a depletion zone 132 having an electric field therein that bends the energy minibands downward. On the other hand, the semiconductor-heterojunction at the interface 230 of the n-type doped superlattice semiconductor 220 results in a depletion zone 232 with an electric field therein that bends the energy bands 240, 250 upward. The result of this construction is that when the outer layers of both superlattice semiconductors 120, 220 are exposed to solar radiation, as illustrated in FIGS. 7 and 8, they generate a net electrical current flowing in the same direction. Specifically, as shown in FIG. 9, photon absorption by the superlattice semiconductor 120 causes valence electrons, represented in FIG. 9 by electrons 162, 164, 166, 168 to jump the band gaps between the respective minibands 140, 150 corresponding with the energy levels of the photons absorbed. The local electric field and the depletion zone 132 drives the electrons 162 164, 166, 168 in the respective conduction minibands 150 to the semiconductor-liquid interface 130 where they are injected at their respective discrete energy levels into the electrolyte L as shown at 170. At the same time, the resulting respective holes 162', 164', 166', 168' are driven in the opposite direction through the plate 118 to the superlattice semiconductor 220.

At the same time, photons absorbed by the superlattice semiconductor 220 cause electrons therein, represented in FIG. 9 by electrons 262, 264, 266, 268, to jump the respective band gaps to the conduction minibands 250 corresponding to the energy absorbed by each from the photons. The local electric field 232 in superlattice 220 then drives the electrons 262, 264, 266, 268 away from the interface 230 and through the metal conductor 118 to the superlattice semiconductor 120. At the same time, the local electric field 232 in the superlattice semiconductor 220 drives the holes 262', 264', 266', 268' to the interface 230 where they are injected at their respective discrete energy levels into the electrolyte L, as indicated at 270. The electrons 170 and holes 270 injected into the electrolyte are received by the redox couples $H^+/H_2$ and $H_2O/O_2$ to drive the chemical reactions that produce hydrogen and oxygen gases.

One of the advantages of this embodiment is that it maximizes solar absorption area in the photoelectrochemical cell 110, thus increasing solar radiation conversion efficiencies. Specifically, rather than having an inert portion of the plate 18 exposed to solar radiation as in the preferred embodiment cell 10 described above, this embodiment cell 110 has a second superlattice semiconductor 220 exposed to the solar radiation S in the same area. The two superlattice semiconductors 120, 220 then combine in series as shown in FIG. 9 and described previously to generate an electric current through the photoelectrochemical cell 110 to drive the redox chemical reactions in the electrolyte. The increased electric current resulting from the two superlattice semiconductors 120, 220 coupled in series produces more chemical product for the same cell area.

The foregoing description is considered as illustrative only of the principles of the invention. Further, since numerous modifications and changes will readily occur to those skilled in the art, it is not desired to limit the invention to the exact construction and processes shown and described above. Accordingly, all suitable modifications and equivalents may be resorted to falling within the scope of the invention as defined by the claims that follow.

The embodiments of the invention in which an exclusive property or privilege is claimed are defined as follows:

1. Photoelectrochemical cell apparatus, comprising first photoelectrode means for injecting charge carriers into an electrolyte and second electrode means for injecting oppositely charged carriers into the electrolyte, said first electrode means including a superlattice semiconductor.

2. The apparatus of claim 1, wherein said superlattice semiconductor includes a crystalline substrate with a plurality of ultrathin alternating layers of semiconductor materials having different band gap energy levels deposited thereon, and said cell includes electrical contact means for electrically connecting said superlattice semiconductor to said second electrode means.

3. The apparatus of claim 2, wherein said semiconductor is enclosed in an insulation material except for the outermost layer, which outermost layer and said second electrode means are exposed to an electrolyte and to solar radiation.

4. The apparatus of claim 3, wherein said second electrode means includes a metal plate electrically connected to said superlattice semiconductor on a side thereof opposite said outermost layer that is exposed to said electrolyte.

5. The apparatus of claim 3, wherein said second electrode means includes a second superlattice semiconductor having one side thereof exposed to said electrolyte and to said solar radiation and the opposite side electrically connected to said first electrode means superlattice semiconductor.

6. The apparatus of claim 5, wherein one of said first and second superlattice semiconductors is a net p-type doped semiconductor and the other of said superlattice semiconductors is a net n-type doped semiconductor.

7. The aparatus of claim 1, wherein said superlattice semiconductor is a compositional superlattice.

8. The apparatus of claim 1, wherein said superlattice semiconductor is a strained layer compositional superlattice.

9. The apparatus of claim 1, wherein said superlattice semiconductor is a doping superlattice.

10. The apparatus of claim 1, wherein said superlattice semiconductor is formed from materials selected from the group consisting of Group III, Group IV, and Group V semiconductor materials, said semiconductor materials being chosen to provide said first electrode means with a plurality of discrete miniband energy levels capable of capturing and injecting hot carriers into said electrolyte near the discrete energy levels at which said hot carriers are initially photoexcited upon exposure of said superlattice semiconductor to solar radiation.

11. Th apparatus of claim 10, wherein said superlattice semiconductor is formed from alternating layers of semiconductor materials having different band gap energy levels to produce said miniband energy levels, said aternating layers being in the range of 50 angstroms 250 to angstroms thick.

12. A method of converting solar radiation to alternate useable energy forms, comprising the steps of using a superlattice semiconductor as a photoelectrode in a photoelectrochemical cell and exposing said superlattice semiconductor to solar radiation to produce a photoelectric current to drive a chemical reaction in the photoelectrochemical cell.

13. The method of claim 12, including the steps of forming the superlattice semiconductor with alternating layers of semiconductor materials having different band gap energy levels to produce discrete miniband energy levels therein capable of capturing hot carriers near their initial photoexcited quantum energy levels and injecting them at approximately those quantum energy levels into said chemical reaction.

14. The method of claim 13, including the steps of tuning the photoelectrochemical cell by providing chemical reaction couples capable of accepting and utilizing said hot carriers near said discrete quantum energy levels.

15. The method of claim 12, including the steps of using a first superlattice semiconductor as a cathode and a second superlattice semiconductor as an anode in said photoelectrochemical cell.

16. The method of claim 15, including the steps of using a net p-type doped superlattice semiconductor as the cathode and a net n-type doped semiconductor as the anode, and electrically coupling said two superlattice semiconductors by a conductor connected to the positive side of the p-type semiconductor and to the negative side of the n-type semiconductor and interfacing the other sides of said superlattice semiconductors with an electrolyte.

17. The method of claim 16, including the steps of coupling said other sides of said superlattice semiconductors with redox couples in said electrolyte.

18. The method of claim 12, including the steps of forming the superlattice semiconductor with alternating layers of semiconductor materials having different band gap energy levels to produce discrete miniband energy levels therein capable of capturing hot-charge carriers at or near their initial photoexcited quantum energy levels, equilibrating such hot-carriers among themselves thereby forming a hot carrier pool at an energy quantum above the smallest miniband gap, and injecting said hot-charge carriers into the electrolyte at or near the energy quantum of said hot-carrier pool.

19. The method of extracting hot carriers from multiple minibands of a superlattice semiconductor for performing useful work at or near the discrete energy levels of such minibands, comprising the steps of utilizing the superlattice semiconductor as a photoelectrode in a photoelectrochemical cell to drive a chemical reaction by injecting the hot carriers into an electrolyte in the photoelectrochemical cell.

20. The method of claim 19, including the steps of coupling the superlattice semiconductor with another electrode in the photoelectrochemical cell by connecting a conductor to one side of said superlattice semiconductor and to said other electrode and immersing said interfacing the opposite side of the superlattice semiconductor and said other electrode with an electrolyte having chemical reaction couples capable of receiving and utilizing hot carriers at or near the discrete energy levels of said minibands.

* * * * *